No. 626,668. Patented June 13, 1899.
A. L. P. CHASLES.
BUOYANT PROPELLER.
(Application filed July 19, 1898.)
(No Model.) 2 Sheets—Sheet 1.
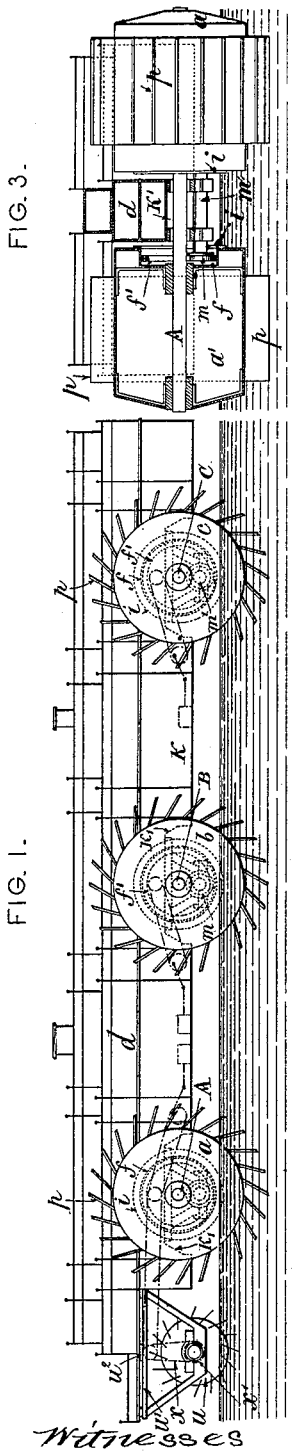
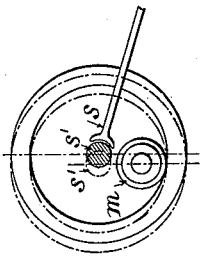
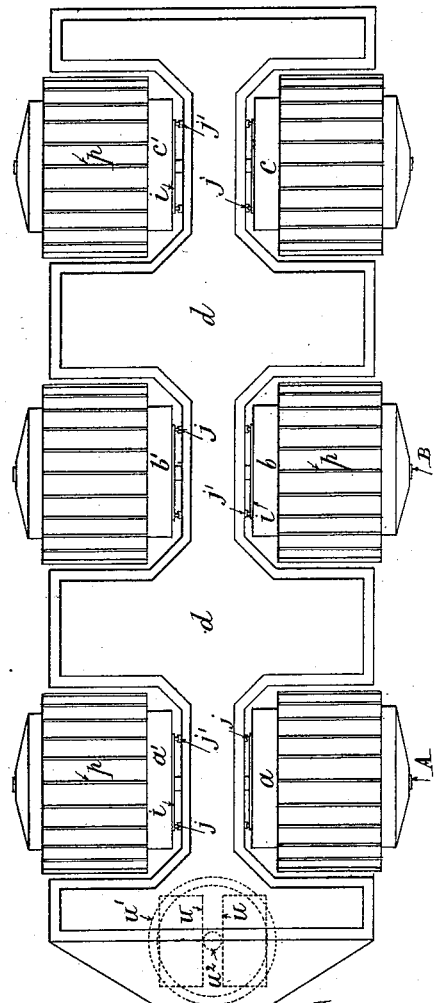
Witnesses
Eugène Wattier
M. Fouard.
Inventor
Adolphe Léon Philarète Chasles
H. B. Willson & Co. Attorneys.
THE NORRIS PETERS CO., PHOTO-LITHO., WASHINGTON, D. C.

No. 626,668. Patented June 13, 1899.
A. L. P. CHASLES.
BUOYANT PROPELLER.
(Application filed July 19, 1898.)
(No Model.) 2 Sheets—Sheet 2.
FIG_5_
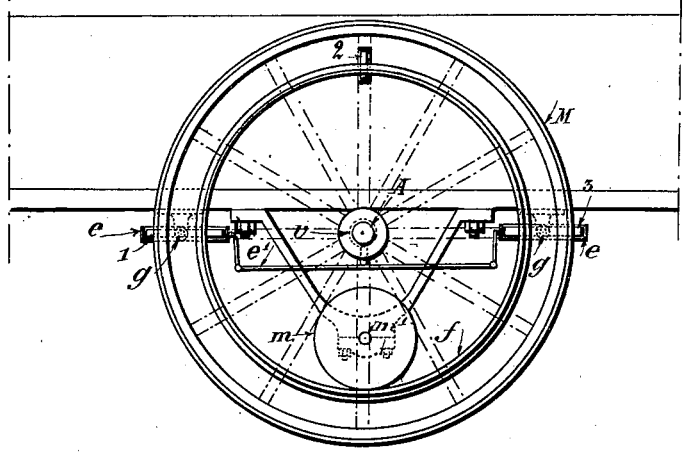
FIG_6_
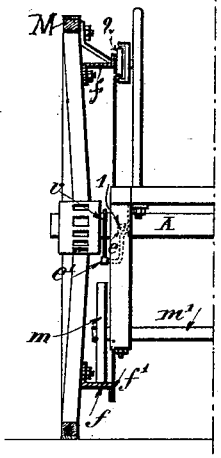
FIG_7_
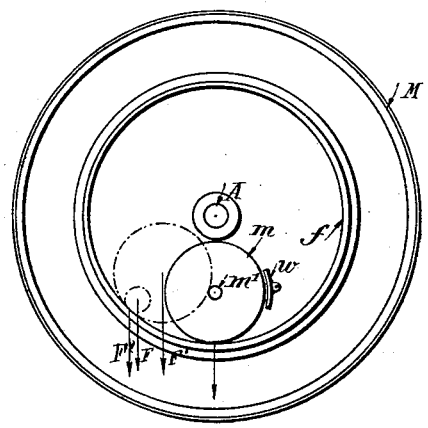
FIG_8_
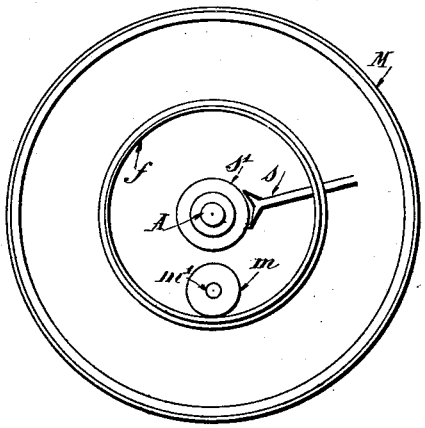
FIG_9_
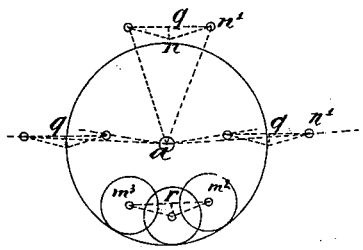
FIG_10_
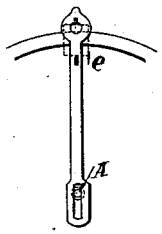
Witnesses
Eugène Wattier
M. Fouard
Inventor
Adolphe, Léon, Philarète Chasles
H. B. Willson & Co., Attorneys.
THE NORRIS PETERS CO., PHOTO-LITHO., WASHINGTON, D. C.

UNITED STATES PATENT OFFICE.

ADELPHE LÉON PHILARÈTE CHASLES, OF ORLEANS, FRANCE.

BOUYANT PROPELLER.

SPECIFICATION forming part of Letters Patent No. 626,668, dated June 13, 1899.

Application filed July 19, 1898. Serial No. 686,355. (No model.)

*To all whom it may concern:*

Be it known that I, ADELPHE LÉON PHILARÈTE CHASLES, clock-manufacturer, of Orleans, Loiret Department, in the Republic of France, have invented certain new and useful improvements in means for propelling vessels both on sea and on land by the employment of intermediate rollers and also utilizing the weight of the vessel or vehicle being propelled for said purpose, of which the following is a specification.

My invention relates to a method of propulsion applicable to ships having roller-keels and to all kinds of wheel land-vehicles whether drawn by animals or propelled by mechanical appliances; and the invention consists, essentially, in causing the propelling power to act not directly on the vehicle's wheels, but on intermediate axles provided with wheels which roll or revolve on the inside of rolling keels or vehicle-wheels, as the case may be, on rails or ways arranged on the ship's floats, or the vehicle's wheels within circles of suitable radii.

In my method of propulsion the wheels or floats of the vessel or the wheels of the vehicle, if the application be made to the latter, are mounted two by two or in pairs on axles or shafts which are independent of the hull in the case of a ship or of the vehicle-frame in the case of a vehicle, while the intermediate axles rest on bearings which are always connected to the body of the ship, or in the case of a vehicle to the frame of the latter, and roll in the direction of their vertical radii and tend to rise until by adherence, caused by the weight of the ship or vehicle acting on said rail at the end of an increasing lever-arm, the floating keels or the wheels of the vehicle are carried forward, overcome the resistance of the rolling movement, and control and determine the propulsion forward.

Particular guiding arrangements provided for the floating rollers or the wheels of a vehicle, combined with a brake acting on the shaft connecting the said rollers or wheels together two by two, permit of rendering really practical the application of my means of propulsion either to steamships, to vehicles drawn by animals, or to mechanical motors.

In the accompanying drawings I have shown by way of example two applications of my method or means of propulsion, the one to ships having roller-keels and the other to light and heavy wheeled vehicles for use on land.

Ships having roller-keels are known as "roller-ships," because the ship is carried and propelled by rollers which roll in the water.

In the drawings, Figure 1 represents a side elevation of a ship having rollers according to my invention. Fig. 2 is a corresponding plan view of the same. Fig. 3 is a cross-section of the ship through a pair of floating cylinders or rollers. Fig. 4 is a detail of the arrangement of the brake. Figs. 5 to 10 relate to the application of my propelling devices to vehicles. Figs. 5 and 6 are respectively an elevation and a section showing a carrying-wheel combined with a rolling rail in the case of a hand-cart. Fig. 7 is a view in elevation of the device applied to a light carriage. Fig. 8 shows an arrangement for heavy farm-carts or other carts. Figs. 9 and 10 are views showing the guiding devices for vehicles.

The application of my system to the propulsion of ships having rolling keels, known as "roller-ships," because the ship is carried and propelled by rollers which roll in the water, does away with all sliding friction of the water on the hull of the ship formed by the rollers and that in a more simple and rational manner than in the case of roller-ships as already known, the smooth rolling cylinders of which are driven by power which is independent of that which drives the screw.

In ships built according to my invention the screws are done away with and there exists but one driving power, which turns by means of my intermediate rolling device the floating cylinders provided with paddles.

The cylinders $a$ $a'$ $b$ $b'$ $c$ $c'$, which carry the body $d$ of the ship, are mounted two by two on horizontal shafts A B C, entirely free, resting on no trundle or journal whatever and passing through openings $k'$, made in the hold K of the ship.

The floating cylinders, the circumferences of which are divided into several water-tight compartments, are provided with paddles $p$, which cause them to gear with the water. The said paddles are so arranged as to come flat into the water, whereby their resistance is increased. In an inner recess $f$ of the cylinders and near the inner edge is arranged a rail $f'$ of circular shape and always above the water-line. On the several rails $f'$ roll the driving-wheels $m$ of my intermediate rolling device. The axles $m'$ of the said wheels supported by the ship's hold distribute the weight of the ship on the floating cylinders at the point of contact of the rails $f'$ and the wheels $m$.

In the forward part of the ship may be arranged a paddle steering-wheel $u$, which aids the action of the rudder and facilitates turning around on the spot. The shaft of the said steering-wheel revolves in bearings supported by the frame $u'$ of circular shape and situated under the deck of the ship. The said frame $u'$, held parallel to the deck by rollers mounted on the latter, is able to turn horizontally on a pivot or swivel $u^2$, the angular movements of the wheel $u$ corresponding to those of a rudder. A belt $x$, acting on a pulley $x'$, fixedly attached to the middle of the shaft of the wheel $u$, causes the latter to revolve, the said wheel being divided by the pulley into two distinct parts provided with paddles.

The shaft of the driving-wheels $m$ is kept parallel with that of the floating cylinders in the following manner: On the inner edge of each floating cylinder, between the water-line and the rail, is a ring $i$, slightly projected, moving against rollers or balls $j$, of large diameter, housed in recess $j'$, fixed to the sides of the hold at the same height as that of the shaft of the cylinders, all danger of getting off the rails being thus prevented.

The driving-shafts are driven directly or by suitable gearing at the same speed by engines placed in the hold, which may also be arranged for receiving goods or freight. The height of the bearings which support the shaft of the driving-wheels $m$ and the diameters of the floating cylinders $a\ b$, &c., must be so determined that the deck for the passenger and sailor cabins shall be out of the water and safe against the strongest waves.

Operation: The steam-engines or electric motors fitted on board the ship drive simultaneously or separately the several shafts of the driving-wheels $m$. The weight of the ship distributes itself at the point of contact of the ring $f'$ and of said driving-wheels $m$ and acts in the same manner as the adhering weight of a locomotive on a railway, the action exercised being all the more powerful as the adhering weight is greater. In the first part of their movement the driving-wheels $m$ rise a little within the floating cylinders, and thus impart a forward movement of the center of gravity and the formation of a couple of forces formed by the weight of the ship and the reaction of the water on the cylinders, the intensity of the said two forces increasing as the driving-wheels rise in the rail until they become strong enough to determine the rotation of the rolling cylinders. From that moment the driving-wheels no longer rise; but their rotation causes by adherence the rotation of the floating cylinders. As the latter are unable to turn on the spot on account of the paddles, they roll in the water and propel the ship forward at a speed which may be rendered as great as possible at will by varying the dimensions and the speed of the driving organs. The fluidity of the water is particularly advantageous in this mode of rolling, as it allows of absorbing the vibration of the outer rim.

It is required of the rails $f'$, which serve to carry the cylinders forward, that they be always above the water-line. Theoretically it would be advantageous to roll as near as possible to the periphery of the cylinders; but in practice it would be very difficult to construct the vessel so that it would not ship water. On the other hand, even with a rail arranged in a circle of short radius, as the weight of the ship is much more considerable than that of the floats forward movement is easily accomplished.

In order to stop the vessel while under full speed, it is necessary to apply the brake-shoe $s$, which acts on the drum $s'$ in the usual manner and produces moderate friction and acts also on the shaft of said rollers and brings said shaft back into vertical line with the driving-wheel $m$, whereby the weight of the ship is prevented from exercising its force forward of the center of gravity of the cylinder, and thereby stopping the rotation of the rollers.

My system of propulsion by intermediate rolling and by using the weight of the thing propelled can be applied in a similar manner to any kind of land-vehicles, whether drawn by animals or by mechanical motors. In case (see Figs. 5 to 10) the driving-wheels $m$, of small diameter, are supported by the frame of the carriage and roll on a rolling way $f$, formed by a ring, sufficiently large, fixed on the spokes of the wheel M, which plays the part of a movable and concentric rail, as in the former case.

In order to prevent lateral violent shocks and running off the rail, I fit into the wheel-rails M the following guiding device: The lateral edge of the roller-ring $f$ forms a flange $f'$, which rides against three rollers 1 2 3, supported by the carriage, and of which those numbered 1 and 3 are horizontal and arranged at the same height as the axle of the wheel-rail. The other (numbered 2) is vertical above the said axle. The said rollers are in proportion as they are intended for carriages moving more quickly in order to prevent a too rapid movement or rotation. The two parallel rollers 1 and 3 are each mounted in a shackle $e$, which is pivoted at $g$ perpendicularly to the axes of the roller. The said shackle is pivoted to a rod $e'$, which terminates in a collar $v$, allowing the axle of the rail-carrying wheel M to turn freely. This arrangement has for its object to always present the rollers 1 2 3 radially with relation to the rail-carrying wheel and to bring the guide-rollers into position perpendicularly to the flange $f'$. Assuming that the shackles of the rollers, Fig. 3, are fixed to the carriage, they will partake of all the movements of the axle $m'$ of the carrying-wheel $m$, the latter when moving coming into and occupying the position shown at $m^2 m^3$. Those rollers have moved to the extent of $n\ q$, equal to $m'\ r$, and have moved forward to the extent of $q\ n'$, equal to $r\ m^2$. They therefore occupy a horizontal or vertical position when passing.

To bring back the vertical roller 2 in the direction of the radius of the wheel-rail, the shackle $e$ terminates in a sliding part engaged in a groove provided on the axle A, Fig. 10. Said sliding part brings the roller directly back perpendicularly to the rail, the friction being small, and the sliding movement at the start being slow and almost *nil* when the carriage is moving. The rollers 1 2, and 3 are preferably of metal, recessed, and provided with rubber peripheries when the carriage is a light one.

In this application of my system of propulsion to land-vehicles the wheel-rails $m$ are mounted two by two on an axle A, which is quite free, as in the case of propulsion on water. One of the two wheels may be fixedly attached to the axle, while the other is free to turn on the same, that being advantageous when turning the carriage. The carrying-wheels $m$ are free to turn on their axles in the case of drawn carriages, while in the case of driving-axles, as in motor-cars, they are fixedly attached to the same.

The wheels $m$ may, if necessary, be provided with solid or hollow rubber rims, according to the kind of carriage in which they are used.

The roller-ring $f$ is placed at a suitable distance from the center of the wheel, according to the purpose for which the carriage is built, and in such a manner as to prevent dirt and sand from getting into the ring. Thus for light carriages intended for good roads and also for hand-carts, Figs. 5 and 6, for example, the ring may be placed fairly near the circumference.

In Fig. 7 is shown a device as applied to a light and very fast carriage. In this case the carrying-wheel $m$ has as large a diameter as can be allowed for by the spaces to be disposed of between the roller-ring $f'$ and the axle A in order that it shall not travel at an exaggerated speed.

Fig. 8 represents a device as applied to a heavy farm-cart or other heavy cart. In this case the carrying-wheel of small diameter allows of compensating for the loss of power caused by the necessity of being higher from the ground.

The requisite power to start the vehicle should be strong enough to overcome the weight of the load and the resistance offered by friction and the irregularities of the surface over which the vehicle must travel.

While I have illustrated and described means for propelling vehicles on land, I have confined my claims to mechanism for the propulsion of vessels at sea.

Having thus fully described my invention, what I claim, and desire to secure by Letters Patent, is—

1. In the propulsion of marine vehicles, the combination two by two of floats fixed to the same axle, divided on their peripheries into water-tight compartments, and having exterior paddles, concentric rails arranged above the water-line, and supporting the driving-wheels of the device above the water-line, as set forth.

2. In a device for the propulsion of vessels, the combination of the shaft provided with rolling cylinders and journaled in receptacles in the bottom of the vessel, a drum fixedly attached to said shaft, a rod provided with a shoe at its inner end for bringing the rollers and cylinders into the same plane, substantially as specified.

Signed at Paris, in the Republic of France, this 22d day of June, 1898.

ADELPHE LÉON PHILARÈTE CHASLES.

Witnesses:
BLÉTRY CAMILLE,
EUGÉNE WATTIE.